United States Patent [19]

Brandt

[11] 4,281,851
[45] * Aug. 4, 1981

[54] SPRING SUSPENSION

[75] Inventor: Vernon Brandt, Reedley, Calif.

[73] Assignee: Brandt Manufacturing, Inc., Reedley, Calif.

[*] Notice: The portion of the term of this patent subsequent to Mar. 7, 1995, has been disclaimed.

[21] Appl. No.: 852,457

[22] Filed: Nov. 17, 1977

Related U.S. Application Data

[63] Continuation of Ser. No. 591,715, Jun. 30, 1975, Pat. No. 4,077,654.

[51] Int. Cl.³ .............................................. B60G 11/00
[52] U.S. Cl. .................................... 280/718; 280/669
[58] Field of Search ............... 301/125, 129; 280/694, 280/699, 718, 720, 669, 661, 137, 135; 180/21

[56] References Cited

U.S. PATENT DOCUMENTS

| Re. 21,009 | 2/1939 | Jonkhoff | 280/694 |
| 1,289,600 | 12/1918 | Aument | 267/54 E |
| 1,662,515 | 3/1928 | Hunt et al. | 280/718 |
| 1,955,968 | 4/1934 | MacPherson | 280/718 |
| 2,511,046 | 6/1950 | Chipps | 267/19 R |
| 2,559,103 | 7/1951 | Anderson | 267/56 |
| 2,744,764 | 5/1956 | Weaver | 280/718 |
| 3,799,562 | 3/1974 | Hinchliff | 280/720 |
| 4,077,654 | 3/1978 | Brandt | 280/718 |

Primary Examiner—Joseph F. Peters, Jr.
Assistant Examiner—Ross Weaver
Attorney, Agent, or Firm—Lyon & Lyon

[57] ABSTRACT

A spring suspension system for mounting a spring member to an axle assembly and vehicle body.

A bracket member adapted to receive and secure the end portion of the spring member is pivotally mounted to the vehicle body and clamping means are provided for securing the spring to the axle assembly.

1 Claim, 2 Drawing Figures

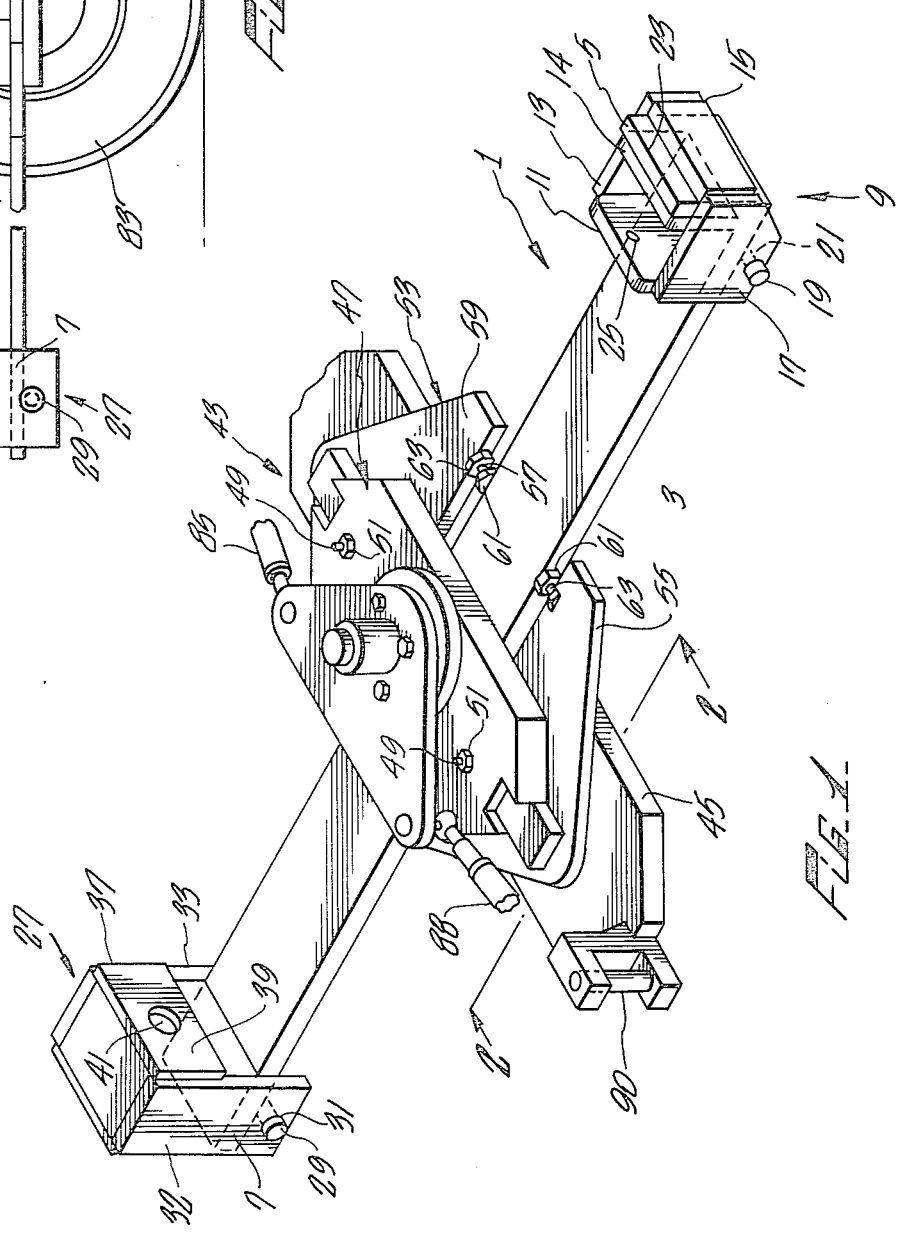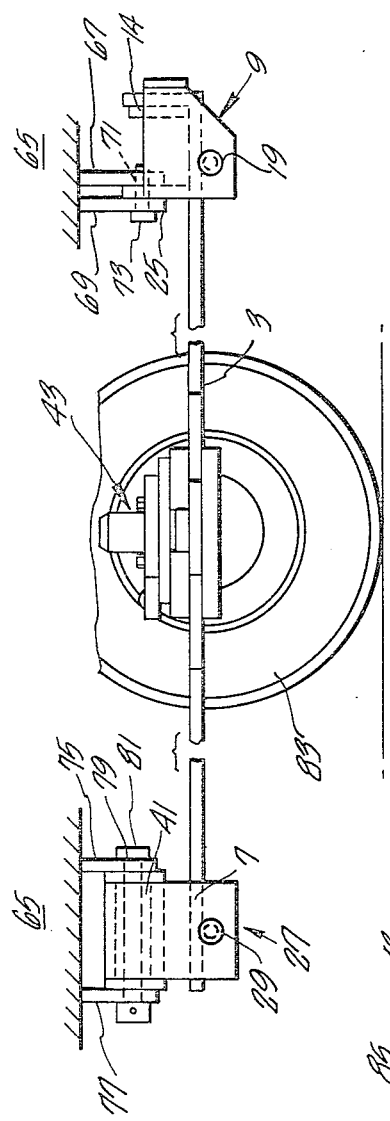

SPRING SUSPENSION

This is a continuation of application Ser. No. 591,715, filed 6-30-75, now U.S. Pat. No. 4,077,654.

BACKGROUND OF THE INVENTION

The invention relates to an apparatus for the spring suspension of a vehicle body such as a forklift or the like. The axle assemblies on vehicles such as forklifts experience extremely severe duty service in that the axles must provide suspension when the vehicle is utilized to pickup, transport and set down heavy loads. Additionally, it is desirable that the spring suspension system provide for smooth riding characteristics when the vehicle is operated without carrying a load. It is thus desirable to have a suspension system which is able to withstand the heavy loading of such a vehicle service while also providing a smooth ride when the vehicle is used in the unloaded condition. Excessive vehicle vibration may produce driver fatigue following extended periods of service.

Additionally, it is desired that a spring suspension system be provided which may be easily repaired and maintained. Furthermore, it is desirable to isolate the vibrations and flexure moments produced in the axle assembly from the vehicle body itself in order that the vehicle may maintain a stable characteristic under heavy loading service, and provide a smooth even ride in the unloaded condition.

An object of this invention is to provide an approved spring suspension apparatus for a forklift or the like. Other additional objectives will be apparent upon reading of the entire specification, drawings and claims.

SUMMARY OF THE INVENTION

In accordance with this invention a spring suspension apparatus for a forklift or the like is provided whereby a spring suspension system may be mounted to an axle assembly and a vehicle body. A bracket member adapted to receive and secure the end portion of the spring member is pivotally mounted to the vehicle body and clamping means are provided for securing the spring to the axle assembly. In a preferred embodiment the spring, which may be defined as a bar member having a main body portion and a first end portion which is substantially perpendicular to the main body portion producing an L-shaped member. The first spring end portion is secured within the bracket by means of a pin. The bracket member is preferably comprised of four wall members forming a rectangular enclosure within which the spring is secured between one of the wall members and an internal wall member.

Additionally, an open ended bracket may be provided in order to support and secure the opposite end portion of said spring, said open ended bracket being also pivotally mounted to the vehicle body. The spring member is preferably clamped to the axle assembly by means of a support plate which is secured to the axle assembly. In a preferred embodiment, the axis of the spring is substantially perpendicular to the axis of the axle assembly, and the bracket and open ended bracket pivot about axes which are substantially parallel to the axis of the spring member.

BRIEF DESCRIPTION OF THE DRAWINGS

FIG. 1 is a pictorial view of a spring suspension system mounted to an axle assembly in accordance with the present invention.

FIG. 2 is a cross-sectional view taken about line 2—2 of FIG. 1.

DESCRIPTION OF PREFERRED EMBODIMENTS

Referring now to FIG. 1, a spring suspension system generally referred to as 1 is depicted having a main spring body portion 3, a first spring end portion 5 and a second spring end portion 7. The spring main body and end portions are preferably formed from a flat bar at least about 15 inches in length, about 2 to about 12 inches in width and about 0.3 to about 2.0 inches in thickness. The first spring body end portion 5 is shown to be located at approximately 90° with respect to the main body portion of the spring thus forming an L-shaped end portion. A bracket referred to generally as 9 is provided with wall members 11, 13, 15 and 17 which form a rectangular enclosure, walls 11 and 15 being substantially parallel and perpendicular to walls 11 and 15. The first spring end portion 5 may be secured within the bracket 9 between wall member 15 and an inner wall member 14. A pivotal pin 19 may be inserted within a hole 21 and a corresponding hole 22 contained within walls 17 and 13 respectively. Such pin 19 may be positioned beneath the spring main body portion 3 thereby supporting the spring within the bracket assembly 9. Additionally, an aperture or hole 25 may be provided in wall member 11, the purpose of this aperture will be discussed later with respect to FIG. 2.

Referring now to the second spring end portion 7, it is seen that such portion may be supported within an open ended bracket 27 by means of a pin 29 which is positioned through holes 31 and 33 in wall members 35 and 37 respectively. The open ended bracket 27 is comprised of three walls in a U-shaped configuration, wall 39 is welded or otherwise secured to previously referred to wall members 35 and 37, walls 35 and 37 being substantially parallel and perpendicular to wall member 39. Aperture 41 within wall member 39 will be discussed later with respect to FIG. 2.

Turning now to a discussion of the clamping of the spring to the axle assembly, an axle assembly referred to generally as 43 in FIG. 1 is provided with a lower plate 45 and an upper plate 47 on either side of the spring main body portion 3. Lower plate member 45 and upper plate member 47 clamp the spring main body portion between them by suitable clamping means such as bolt members 49 and nut members 51.

In a preferred embodiment, the main body portion of the spring may be laterally restrained by means of a adjustable lateral clamp member 53 which is suitably secured to a middle plate member 55 and lateral clamping member 57 which is suitable secured to a middle plate 59. Said middle plates also being clamped between plates 55 and 59 upper and lower plates 47 and 45. Lateral restraining means 53 have had adjustable portion such as a nut 61 which may be threaded upon an externally threaded bolt 63 until the nut 61 securely engages the spring main body portion 3.

Referring now to FIG. 2, the bracket 9 is shown pivotally mounted to a body generally referred to as 65 by means of connective plates 67 and 69 which are secured to the body 65 and are provided with a hole or aperture 71 of the same approximate geometry as the aperture 25 within which a pin or other suitable pivot device 73 may be inserted thereby allowing the bracket 9 and the spring suspension system 1 to pivot about the body adjacent the spring end portion 5. Similarly, connective plates 75 and 77 may be secured to the body 65 adjacent the open ended bracket 7, plates 77 and 75 being provided with the hole or aperture 79 which is of the approximate geometrical configurations as aperture 41 within which a pin or other pivotal member 81 may be positioned thereby allowing the open ended bracket and the spring suspension system to rotate adjacent the end portion of the spring 7. The entire spring assembly may thus be removed for repair or replacement by removing pins 75 and 79 and bolts 49. Bracket 9 may be removed by removing pins 19 and 73. Similarly open ended bracket 27 may be removed by removing pins 79 and 29. Further, pins 79 and 73 allow for the isolation of the flexure of the spring assembly 1 from the vehicle body 65.

The wheel assembly generally referred to as 83 is further shown in FIG. 2, such wheel would be mounted on wheel mounting assemblies 85 which are partially shown in FIG. 1.

In a preferred embodiment the bracket 7 is positioned either slightly higher or slightly lower than that the elevation of the axel assembly 43, thereby inclining the axel assembly 43 and a king pin 90 housed therein. The wheel assembly 83 pivots about the king pin 90 and the king pin 90 is slightly inclined so as to provide "caster", a term well known in the art, which assists in the wheel assembly 83 pivoting about king pin 90 and axle assembly 43. Preferably this inclination is between about 0.5 and about 4 degrees from a vertical position.

Although preferred embodiments of this invention have been described, it will be readily apparent that alterations and modifications may be resorted to without departing from the scope of the invention, and such alterations and modifications are intended to be included within the scope of the appended claims.

I claim:

1. A spring suspension system for mounting to an axle assembly and a vehicle body comprising:

a king pin;

a spring member;

a first bracket member adapted to receive and secure a first end portion of said spring member, a second bracket member adapted to receive and secure a second and opposite end portion of said spring, said first bracket being pivotally mounted to said vehicle body, both said first and second bracket members being mounted on a longitudinal axis with respect to said vehicle body, said first bracket member being further defined as being positioned to secured said first end portion of said spring member at an elevation which differs from the elevation of said axle assembly, thereby inclining said axle assembly and said king pin housed therein to an angle between 0.5° and 4° from the vertical; and clamping means for securing said spring to said axle assembly such that said spring extends in a direction substantially perpendicular to said axle assembly.

* * * * *